(12) United States Patent
Ahn et al.

(10) Patent No.: US 6,888,282 B2
(45) Date of Patent: May 3, 2005

(54) STATOR OF INDUCTION MOTOR

(75) Inventors: Jun-Ho Ahn, Seoul (KR); Seung-Do Han, Incheon (KR); Hyoun-Jeong Shin, Incheon (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/757,402

(22) Filed: Jan. 15, 2004

(65) Prior Publication Data
US 2005/0067909 A1 Mar. 31, 2005

(30) Foreign Application Priority Data
Sep. 30, 2003 (KR) .................................. 10-2003-0068024

(51) Int. Cl.[7] ................................................. H02K 1/00
(52) U.S. Cl. ....................................... 310/179; 310/208
(58) Field of Search ................................. 310/179, 187, 310/208, 216–218, 254, 258–259

(56) References Cited

U.S. PATENT DOCUMENTS

| | | | | |
|---|---|---|---|---|
| 5,260,620 A | * | 11/1993 | Morrill | 310/185 |
| 5,574,342 A | * | 11/1996 | Okamoto | 318/254 |
| 6,278,213 B1 | * | 8/2001 | Bradfield | 310/216 |
| 6,433,456 B1 | * | 8/2002 | Higashino et al. | 310/263 |

* cited by examiner

Primary Examiner—Thanh Lam
(74) Attorney, Agent, or Firm—Birch, Stewart, Kolasch & Birch, LLP

(57) ABSTRACT

Disclosed is a stator of an induction motor, the induction motor comprising: a stator provided with a main winding coil and an auxiliary winding coil at a plurality of slots formed at a body of the stator; an induction rotor rotatably inserted into the stator; and a magnet rotor rotatably inserted between the stator and the induction rotor. Coil spans, intervals between the slots of the stator, are different each other thus to have an increased counter electromotive force induced to the main winding coil at the time of driving, thereby enhancing efficiency of the motor. Also, end lengths of the main winding coil and the auxiliary winding coil become short and the structure becomes simple, thereby reducing a consumption amount of the coil and facilitating a coil winding work.

17 Claims, 5 Drawing Sheets

COIL SPAN RATE: 1.5:1

COIL SPAN RATE: 2.75:1

STATOR OF INDUCTION MOTOR

This Nonprovisional application claims priority under 35 U.S.C. § 119(a) on Patent Application No(s). 10-2003-0068024 filed in KOREA on Sep. 30, 2003, the entire contents of which are hereby incorporated by reference.

BACKGROUND OF THE INVENTION

1. Field of the Invention

The present invention relates to an induction motor, and more particularly, to a stator of an induction motor capable of facilitating an assembly by simplifying a structure and capable of enhancing a counter electromotive force.

2. Description of the Conventional Art

Generally, an induction motor for converting electric energy into kinetic energy is used as a power source of each device and has various kinds.

FIG. 1 is a frontal section view showing one example of the induction motor, and FIG. 2 is a lateral section view showing of the induction motor. As shown, the induction motor is provided with a winding coil 210 therein and comprises: a stator 200 fixedly coupled to inside of a casing 100 of a predetermined shape; an induction rotor 300 rotatably inserted into the stator 200; a shaft 400 forcibly pressed into the induction rotor 300; and a magnet rotor 500 formed as a cylindrical shape and rotatably inserted between the stator and the induction rotor 300.

The induction rotor 300 comprises a cylindrical body 310 having a certain length, a plurality of conductor bars 320 coupled at an edge of the cylindrical body 310, end rings 330 coupled at both side surfaces of the cylindrical body 310 for connecting both ends of the conductor bars 320, and a shaft hole 340 formed at the center of the cylindrical body 310 for forcibly pressing the shaft 400.

The shaft 400 is supported at the casing 100 by a bearing 410, the magnet rotor 500 is supported at a magnet holder 510 formed as a cup shape, and the magnet holder 510 is supported at the shaft 400 by a bearing 520.

Operation of the induction motor will be explained as follows.

When an alternating current is supplied to the induction motor, an induction rotating magnet field is generated at the stator 200 on which a coil is wound, and by the induction rotating magnet field, the magnet rotor 500 is rotated. According to this, an induction rotating magnet field having an intensive magnet field is generated by the magnet rotor 500, and thereby the induction rotor 300 is rotated. As the induction rotor 300 is rotated, the shaft 400 coupled thereto is rotated thus to transmit a rotational force.

The induction motor is mainly applied to home electronics such as an air conditioner, a refrigerator, an electric fan, and etc. The home electronics has to have not only a low manufacturing cost in an aspect of price competitiveness and energy saving but also a low power consumption. To this end, a manufacturing cost of a motor which serves as a power source of the home electronics has to be lowered and efficiency thereof has to be maximized.

A component which greatly influences on the manufacturing cost and efficiency is the stator, and a structure of the stator will be explained in more detail.

FIG. 3 is a lateral section view of a stator constituting the induction motor. As shown, the stator of the induction motor comprises a stator body 220, and a winding coil 210 wound on the stator body 220. The stator body 220 includes a body portion 221 having a certain outer diameter and a length, a rotor inserting hole 222 formed in the body portion 221 for inserting the induction rotor 300, and a plurality of slots 223 formed at the body portion 221 with a certain interval and connected to the rotor inserting hole 222. One side of the slots 223 is formed as an opened shape connected to the rotor inserting hole 222, and a coil span P1, an interval between the slots 223 is constant. A protruding part between the slots 223 forms teeth 224, and stepping protrusions 225 are respectively extended at both sides of end portions of the teeth 224. End widths of the teeth 224 including the stepping protrusions 225 are the same.

The winding coil 210 is divided into two. The one is an auxiliary winding coil 211 used at the time of an initial starting of the magnet rotor 500, and the other is a main winding coil 212 used at the time of outputting of the magnet rotor 500 and the induction rotor 300 after the starting.

The main winding coil 212 divides the slots 223 according to a condition, and is inserted between the slots 223 with intervals corresponding to the number of the divided slots thus to be wound on the teeth 224. Also, the auxiliary winding coil 211 is inserted between the slots 223 with intervals corresponding to the number of the divided slots thus to be wound on the teeth 224. The main winding coil 212 is positioned outside the slots 223, and the auxiliary winding coil 211 is positioned inside the slots 223.

However, said structure is suitable for an induction motor which is not provided with the magnet rotor 500 and is inefficient for an induction motor provided with the magnet rotor 500. That is, said structure is efficient for an induction motor which is not provided with the magnet rotor 500 since the auxiliary winding coil 211 is used at the time of starting the induction rotor 300 and the main winding coil 212 is used at the time of a normal driving of the induction rotor 300 thus to have a greater output by the main winding coil 212. However, in the induction motor provided with the magnet rotor 500, the auxiliary winding coil 211 and the main winding coil 212 are used to initially start the magnet rotor 500 and to generated an output, so that said structure is inefficient. Also, coil ends of the main winding coil 212 and the auxiliary winding coil 211 are long and an winding working is complicated thus to have a high manufacturing cost.

SUMMARY OF THE INVENTION

Therefore, an object of the present invention is to provide to a stator of an induction motor capable of facilitating an assembly by simplifying a structure and capable of enhancing a counter electromotive force.

To achieve these and other advantages and in accordance with the purpose of the present invention, as embodied and broadly described herein, there is provided a stator of an induction motor, the induction motor comprising a stator provided with a main winding coil and an auxiliary winding coil at a plurality of slots formed at a body of the stator; an induction rotor rotatably inserted into the stator; and a magnet rotor rotatably inserted between the stator and the induction rotor, wherein coil spans, intervals between the slots, are different each other.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Hereinafter, a stator of an induction motor according to the present invention will be explained in more detail.

Figure 1:
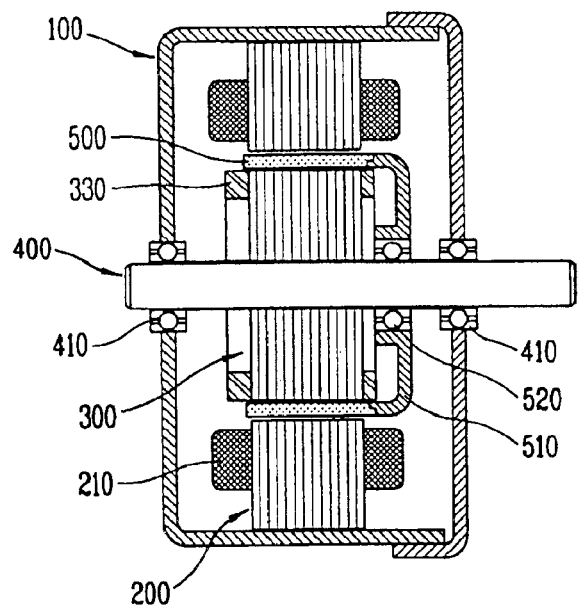
FIG. 1 is a frontal section view showing one example of the induction motor.
Figure 2:
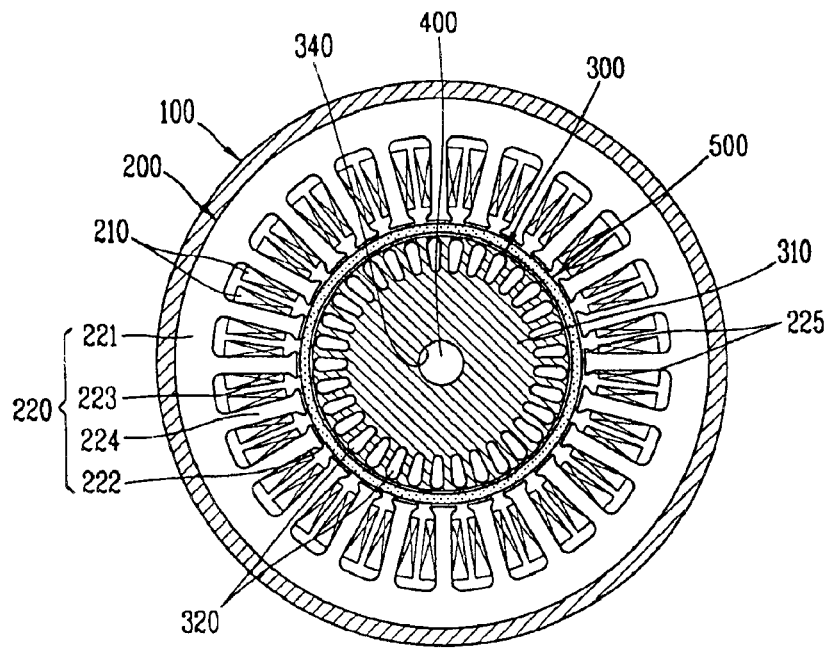
FIG. 2 is a lateral section view showing of the induction motor.
Figure 3:
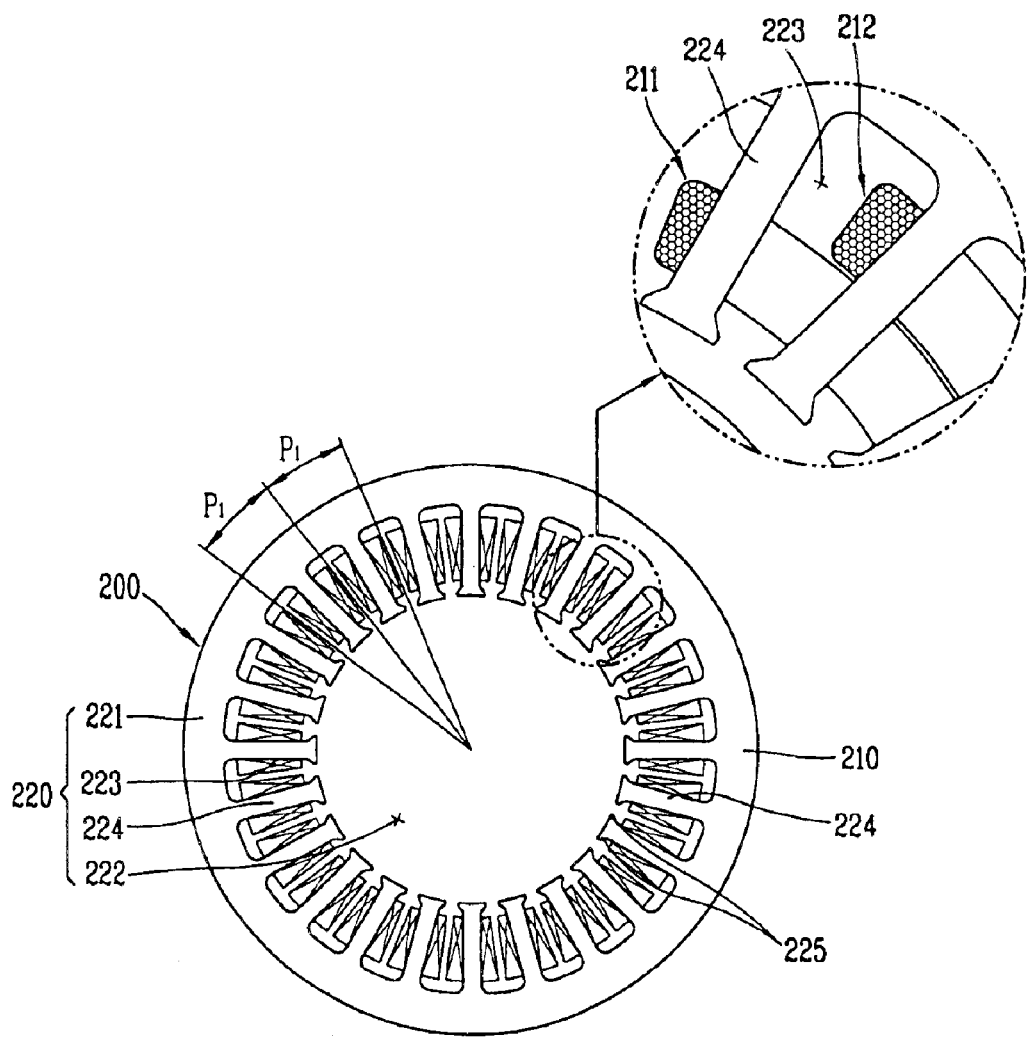
FIG. 3 is a lateral section view of a stator constituting the induction motor.
Figure 4:
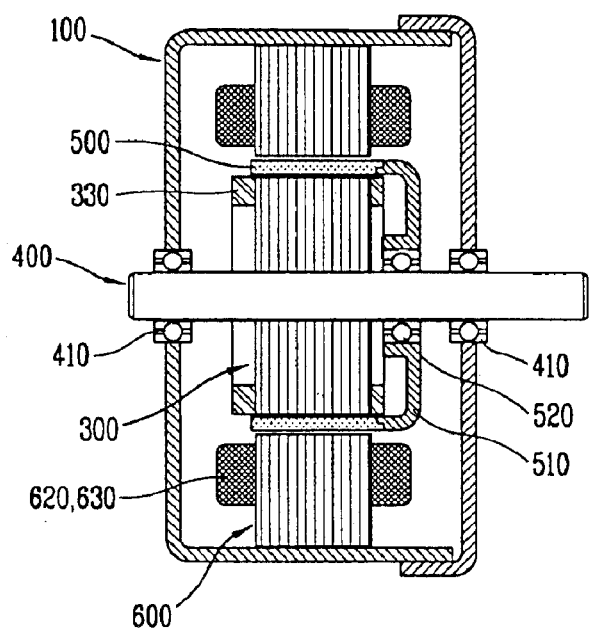
FIG. 4 is a frontal section view of an induction motor provided with one embodiment of a stator according to the present invention.
Figure 5:
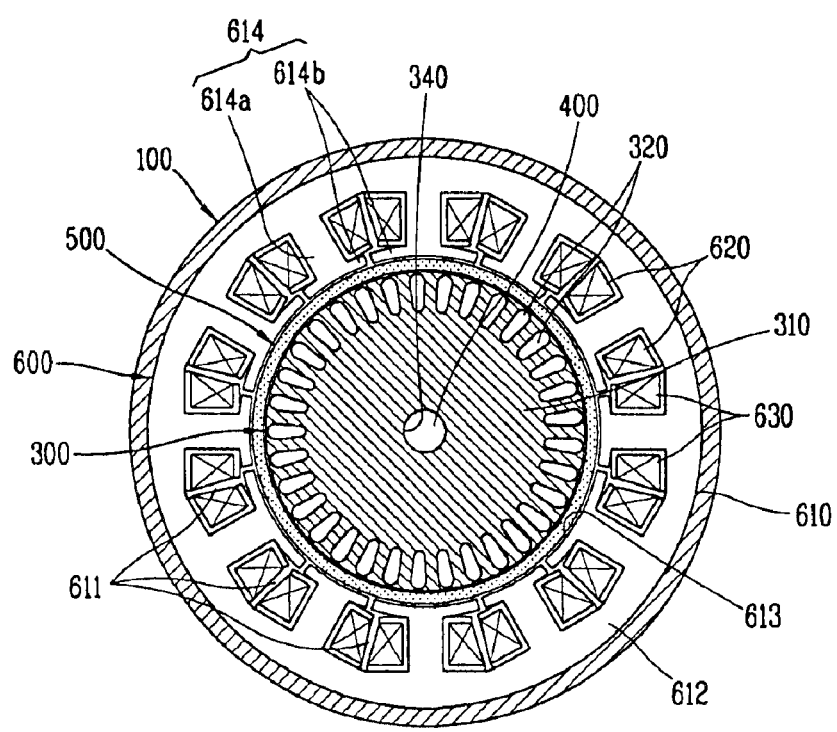
FIG. 5 is a lateral view of the induction motor.

FIG. 4 is a frontal section view of an induction motor provided with one embodiment of the induction motor stator according to the present invention, and FIG. 5 is a right lateral view of the induction motor. The same reference numerals will be given to the same parts as the conventional art.

As shown, the induction motor comprises a stator 600 provided with a main winding coil and an auxiliary winding coil at a plurality of slots 611 formed at a stator body 610, an induction rotor 300 rotatably inserted into the stator 600, and a magnet rotor 500 rotatably inserted between the stator 600 and the induction rotor 300.

The induction rotor 300 comprises a cylindrical body 310 having a certain is length, a plurality of conductor bars 320 coupled at an edge of the cylindrical body 310, end rings 330 coupled at both side surfaces of the cylindrical body 310 for connecting both ends of the conductor bars 320, and a shaft hole 340 formed at the center of the cylindrical body 310 for forcibly pressing the shaft 400.

The shaft 400 is supported at the casing 100 by a bearing 410, the magnet rotor 500 is supported at a magnet holder 510 formed as a cup shape, and the magnet holder 510 is supported at the shaft 400 by a bearing 520.

Figure 6:
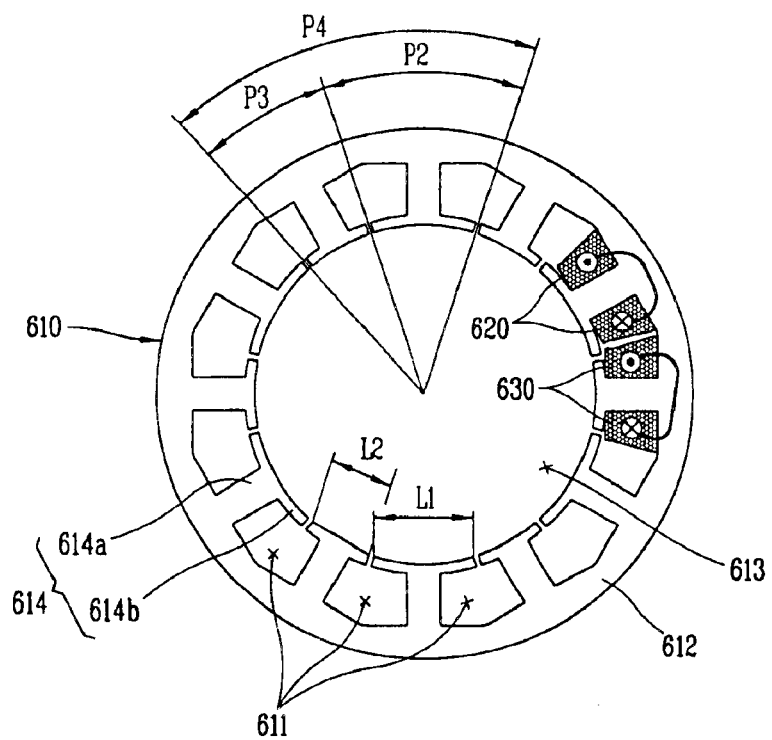
FIG. 6 is a lateral view showing the stator of the induction motor according to the present invention.

As shown in FIG. 6, the induction motor stator 600 of the present invention includes a stator body 610 and a main winding coil 620/an auxiliary winding coil 630 wound on the stator body 610. The auxiliary winding coil 630 is used to start the magnet rotor 500 and the main winding coil 620 is used to normally drive the magnet rotor 500 after the starting.

The stator body 610 includes a body portion 612 having a certain outer diameter and a length, a rotor inserting hole 613 formed in the body portion 612 for inserting the induction rotor 300, and a plurality of slots 611 formed at the body portion 612 and connected to the rotor inserting hole 613. Herein, coil spans P2 and P3, the interval between the slots 611 are formed to be different to each other.

The slots 611 are formed in a state that two adjacent coil spans P2 and P3 are differently formed each other.

Two adjacent coil spans P2 and P3 in one direction are called as a pair of coil spans C, and the pair of coil spans C are formed as the same shape and the same size. Said two coil spans P2 and P3 constituting the pair of coil spans C have different sizes each other, a total pitch P4 of each pair of coil spans C is the same.

A ratio between said two coil spans P2 and P3 constituting the pair of coil is spans C can be variously implemented, but is preferably 1.5:1 or 2.75:1.

In the meantime, teeth 614 are formed between the slots 611 formed at the stator body 610 and end widths of the teeth 614 are differently formed.

The teeth 614 is composed of a winding portion 614a having a certain width and a length, and an end portion 614b respectively extending from both end sides with a certain width and length. An outer circumferential surface of the teeth nearly forms an inner circumferential surface of the rotor inserting hole 614.

End widths of two adjacent teeth 614 in one direction, that is, lengths L1 and L2 of the end portions are different each other, and said two different teeth 614 are called as a pair of teeth. Pairs of teeth adjacent to the pair of teeth have the same shape and the same size.

The slots 611 have the same size and shape, and widths and lengths of the teeth 614 formed between the slots 611 are the same.

A ratio between two teeth end widths L1 and L2 constituting the pair of teeth can be variously implemented, but is preferably 1.5:1 or 2.75:1.

The main winding coil 620 is respectively wound on the teeth 614 positioned at the coil span P2 which is relatively greater, and the auxiliary winding coil 630 is wound on the teeth 614 positioned at the coil span P3 which is relatively less. The length L1 of the end portion of the teeth 614 positioned at the coil span P2 is relatively longer, and the length L2 of the end portion of the teeth 614 positioned at the coil span P3 is relatively shorter.

The main winding coil 620 and the auxiliary winding coil 630 are alternately positioned each other, and thereby the coil ends of the main winding coil 620 and the auxiliary winding coil 630 have lengths shorter than those of the conventional art.

The stator body 610 can be formed accordingly as a plurality of silicon steel plates are laminated.

Hereinafter, operational effects of the induction motor stator will be explained as follows.

First, when an alternating current, a commonly used power source, is supplied to the induction motor, an induction rotating magnetic field is generated at the stator 600 on which the main winding coil 620 and the auxiliary winding coil 630 are wound by a current applied to the main winding coil 620 and the auxiliary winding coil 630. By the induction rotating magnetic field, the magnet rotor 500 is rotated. According to this, an induction rotating magnetic field having a strong magnetic flux is generated by the magnet rotor 500, and thereby the induction rotor 300 is rotated. According to this, the shaft 400 coupled to the induction rotor 300 is rotated thus to transmit a rotational force. In this process, the auxiliary winding coil 630 on which a current flows starts the magnet rotor 500 initially, and the main winding coil 620 on which a current flows generates an output of the induction rotor 300 and the magnet rotor 500.

In the induction motor stator 600, the coil span P2 where the main winding coil 620 is positioned is different from the coil span P3 where the auxiliary winding coil 630 is positioned, that is, the end width L1 of the teeth 614 on which the main winding coil 620 is wound is relatively greater than the end width L2 of the teeth on which the auxiliary winding coil 630 is wound, thereby increasing counter electromotive force. More specifically, in the conventional art, the end widths of the teeth 224 which nearly form an inner circumferential surface of the rotor inserting hole 222 of the stator for inserting the induction rotor 300 and the magnet rotor 500 are constant, so that a counter electromotive force induced to the main winding coil 212 is relatively less. However, in the present invention, the end widths L1 and L2 of the teeth 614 which nearly form an inner circumferential surface of the rotor inserting hole 613 of the stator are different from each other, that is, the end width L1 of the teeth 614 on which the main winding coil 620 is wound is relatively greater than the end width L2 of the teeth 614 on which the auxiliary winding coil 630 is wound, so that the counter electromotive force induced to the main winding coil 620 is relatively greater.

Figure 7:
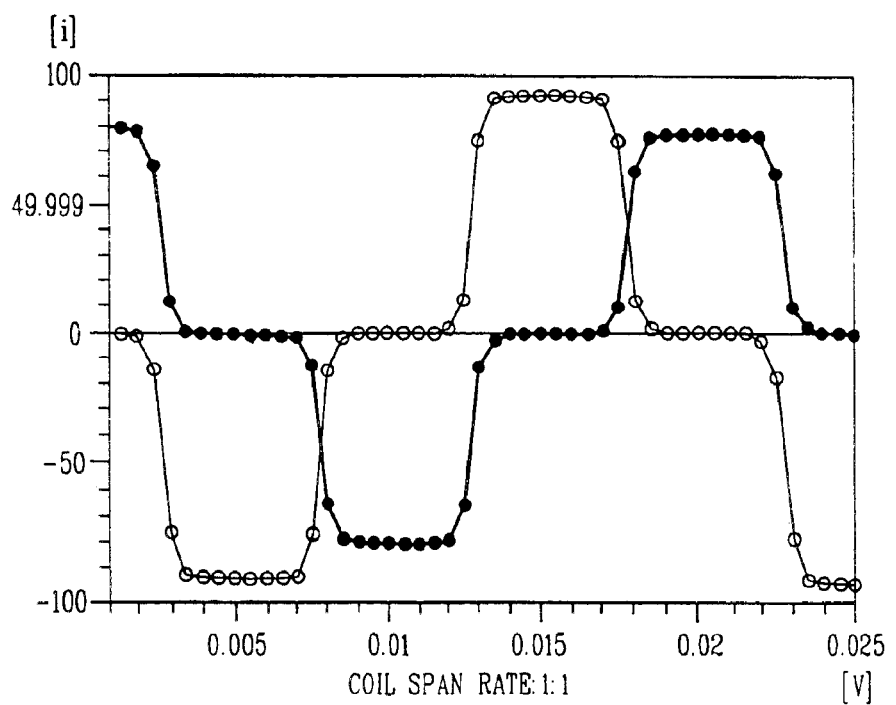
FIG. 7 is a waveform of a back-emf of the conventional induction motor stator having a uniform coil span.
Figure 8:
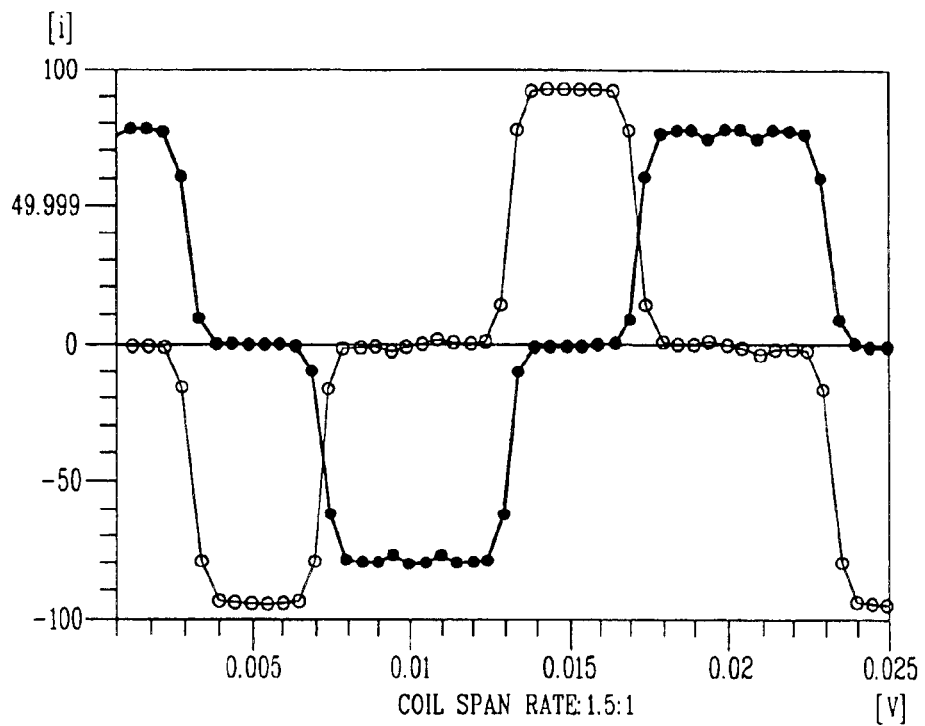
FIG. 8 is a waveform of a back-emf of a case that a ratio of coil spans is 1.5:1 in the induction motor stator according to the present invention.
Figure 9:
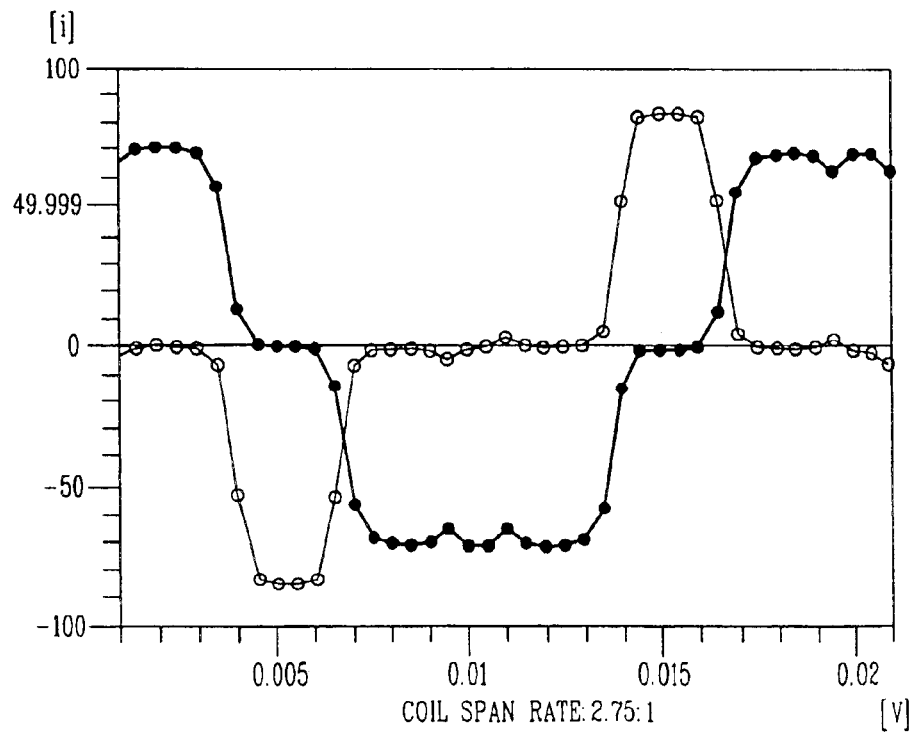
FIG. 9 is a waveform of the back-emf of a case that a ratio of the coil spans is 2.75:1 in the induction motor stator according to the present invention.

FIG. 7 is a waveform of a back-emf of the conventional induction motor stator having a uniform coil span, FIG. 8 is a waveform of a back-emf of a case that a ratio of coil spans is 1.5:1 in the induction motor stator according to the present invention, and FIG. 9 is a waveform of the back-emf of a case that a ratio of the coil spans is 2.75:1 in the induction motor stator according to the present invention.

As shown, when the coil spans are uniform, voltage widths generated at the main winding coil and the auxiliary winding coil are constant. However, when the coil spans are different each other, a voltage width generated at the main winding coil is relatively greater than a voltage width generated at the auxiliary winding coil thus to have an increased output.

Also, in the induction motor stator 600 according to the present invention, the coil spans P2 and P3, distances between the slots 611, are different each other, the main winding coil 620 is respectively wound on the teeth 614 positioned at the coil span which is relatively greater, and the auxiliary winding coil 630 is respectively wound on the teeth 614 positioned at the coil span which is relatively less. According to this, the coil ends of the main winding coil 620 and the auxiliary winding coil 630 become short and the structure becomes simple.

As aforementioned, in the induction motor stator according to the present invention, the counter electromotive force induced to the main winding coil 620 at the time of driving is increased thus to have an increased output, thereby increasing efficiency of the motor. Also, accordingly as the end lengths of the main winding coil 620 and the auxiliary winding coil 630 become short and the structure becomes simple, a consumption amount of the coil is reduced and a coil winding work is facilitated, thereby enhancing an assembly productivity and decreasing a manufacturing cost.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A stator of an induction motor, comprising:
   a stator body having a plurality of slots formed therein;
   a plurality of coil scans located between the slots;
   at least one main winding coil; and
   at least one auxiliary winding coil;
   wherein two adjoining coil spans are different from each other, and wherein the main winding coil and the auxiliary winding coil are alternately positioned within one of the two adjoining coil spans and the other of the two adjoining coil spans, respectively.

2. The stator of claim 1, wherein two adjoining coil spans in one direction are called as a pair of coil spans, the pairs of coil spans are formed as the same shape and the same size, and two coil spans constituting the pair of coil spans are different each other.

3. The stator of claim 2, wherein a ratio between said two coil spans constituting the pair of coil spans is 1.5:1.

4. The stator of claim 2, wherein a ratio between the two coil spans constituting the pair of coil spans is 2.75:1.

5. An induction motor comprising:
   a stator body having a plurality of slots formed therein;
   a plurality of coil spans located between the slots;
   at least one main winding coil; and
   at least one auxiliary winding coil;
   an induction rotor rotatably inserted into the stator;
   a magnet rotor rotatably inserted between the stator and the induction rotor; and
   a plurality of teeth formed between the slots, each of the plurality of teeth having a main body and an end, the end widths of two adjacent teeth being different from each other, the main winding coil and the auxiliary winding coil being alternately positioned on one of the two adjacent teeth and the other of the two adjacent teeth, respectively.

6. The induction motor of claim 5, wherein the slots have the same size and the same shape, and lengths and widths of the teeth formed between the slots are the same.

7. The induction motor of claim 5, wherein two adjacent teeth in one direction are a pair of teeth, and each of the pairs of teeth has the same shape and the same size.

8. The induction motor of claim 7, wherein a ratio between the end widths of two teeth constituting the pair of teeth is 1.5:1.

9. The induction motor of claim 7, wherein a ratio between the end widths of two teeth constituting the pair of teeth is 2.75:1.

10. The stator of claim 1, wherein the main winding coil is wound on a tooth positioned within a wider coil span of the two adjoining coil spans, and the auxiliary winding coil is wound on a tooth positioned within a narrower coil span of the two adjoining coil spans.

11. The stator of claim 10, wherein the main winding coil completely encircles the tooth positioned within the wider coil span of the two adjoining coil spans, and the auxiliary winding coil completely encircles the tooth positioned within the narrower coil span of the two adjoining coil spans.

12. The induction motor of claim 5, wherein two adjoining coil spans are different from each other, the main winding coil and the auxiliary winding coil are alternately positioned within one of the two adjoining coil spans and the other of the two adjoining coil spans, respectively.

13. The induction motor of claim 12, wherein the main winding coil is wound on the tooth positioned within a wider coil span of the two adjoining coil spans, and the auxiliary winding coil is wound on the tooth positioned within a narrower coil span of the two adjoining coil spans.

14. The induction motor of claim 13, wherein the main winding coil completely encircles the tooth positioned within the wider coil span of the two adjoining coil spans, and the auxiliary winding coil completely encircles the tooth positioned within the narrower coil span of the two adjoining coil spans.

15. The induction motor of claim 5, wherein the auxiliary winding coil is for starting the magnet rotor and the main winding coil is for driving the magnet rotor after the magnet rotor is started.

16. A induction motor comprising:

a stator provided with a main winding coil and an auxiliary winding coil at a plurality of slots formed at a body of the stator;

an induction rotor rotatably inserted into the stator; and a magnet rotor rotatably inserted between the stator and the induction rotor;

wherein two adjoining coil spans are different from each other, and a ratio between the two adjoining coil spans is 2.75:1.

17. A induction motor comprising:

a stator provided with a main winding coil and an auxiliary winding coil at a plurality of slots formed at a body of the stator;

an induction rotor rotatably inserted into the stator;

a magnet rotor rotatably inserted between the stator and the induction rotor; and a plurality of teeth formed between the slots, end widths of two adjacent teeth being different from each other, a ratio between the end widths of two adjoining teeth being 2.75:1.

* * * * *